June 18, 1929.　　　R. RUDENBERG　　　1,717,413

THERMOELECTRIC APPARATUS

Filed Jan. 27, 1927

WITNESSES:
R. S. Harrison
F. W. Lyle.

INVENTOR
Reinhold Rudenberg
BY
Wesley G. Carr
ATTORNEY

Patented June 18, 1929.

1,717,413

UNITED STATES PATENT OFFICE.

REINHOLD RUDENBERG, OF BERLIN-GRUNEWALD, GERMANY, ASSIGNOR TO WESTINGHOUSE ELECTRIC & MANUFACTURING COMPANY, A CORPORATION OF PENNSYLVANIA.

THERMOELECTRIC APPARATUS.

Application filed January 27, 1927, Serial No. 164,104, and in Germany January 30, 1926.

My invention relates to apparatus for transforming heat energy into electrical energy, and particularly to methods and means for making this transformation without the intervention of rotating machines or the employment of electro-magnetic induction.

It will be observed that the standard type of steam power plant of the present day transforms the potential energy inherent in a vapor under pressure to electrical energy through the medium of a revolving prime-mover, and uses this prime-mover in turn to transform the mechanical energy into electrical energy through the medium of a dynamo-electric machine. This rather roundabout procedure in which steam, or some other vapor under pressure, drives a turbine which in turn drives the rotor of an electrical generator, is virtually the only existing process for bringing about the energy transformation in question. Both the turbine and the electrical generator are relatively heavy and expensive machines, and their construction involves problems in mechanical design and in insulation which impose limitations making difficult the increase of power and voltage beyond those of existing installations. One instance of these limitations is seen in the fact that in the opinion of many engineers a continuous-current generator of high voltage would be very valuable in connection with the long distance transmission of power; yet they know no practicable way of constructing a machine of anything like the magnitude of power and voltage they desire.

It will be noted that these limitations are, in fact, attributes of moving machines, on the one hand, and of the insulation of moving electrical windings on the other. These considerations as well as many others point, as an avenue of escape from existing limitations, to the elimination of revolving prime-movers and electrical generators by the development of means for transforming the free energy resident in high-pressure vapor directly into available electrical energy without its passing through the phase of mechanical energy at all.

A principal object of my invention has been to provide means for making such a direct transformation. This general result I accomplish by permitting the vapor to attain a high velocity by expanding through an orifice into a low-pressure receiver, and having attained this high velocity to traverse a magnetic field. All vapors are ionized in some degree, but I find it preferable to artificially increase the ionization of the vapor stream just prior to its passage into the magnetic field. The rapidly moving ions traversing the magnetic field are, in accordance with well-known electrical laws, deflected from the path followed by uncharged molecules, the positive ions being deflected to one side and the negative ions to the other. The ions of like polarity are thus separated from those of opposite kind, and segregated at opposite sides of the stream of flowing gas. Here they may be made to deposit their charges on suitable electrodes and thus to supply electrical energy to work circuits connected thereto. The initial potential energy of the vapor may thus, without the intervention of revolving prime-mover or dynamo-electric machines, be transformed into electrical energy available for any desired use.

It is further possible to return the discharged ions to the original high-pressure-vapor phase by a proper condenser, pump, and boiler, and thus to send the same fluid repeatedly through the work cycle just outlined, thereby transforming the thermal energy of a heat source economically into electrical energy.

Other objects accomplished by my invention will become apparent from reading the following description.

With such objects in view my invention comprises the methods and structural arrangements hereinafter described and claimed, and illustrated in the accompanying drawings wherein Fig. 1 shows diagrammatically the general arrangement of one practical embodiment of my invention.

Figure 1:
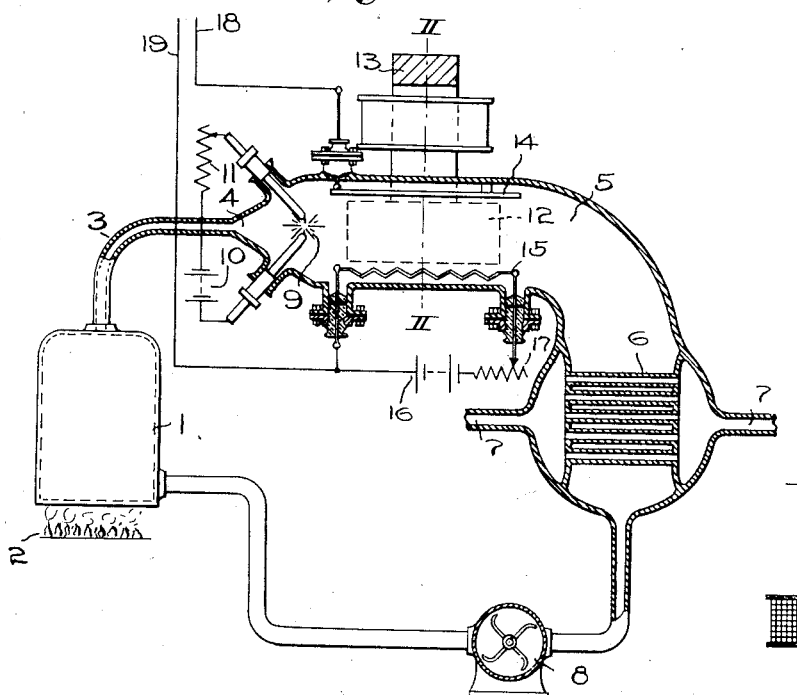

Referring specifically to Fig. 1 the reference character 1 describes a boiler containing any liquid capable of forming a vapor which can be ionized. Mercury is one such liquid. This liquid may be vaporized by heat from any convenient source 2. The vapor passes through the duct 3 to an orifice 4 from which it issues into an enlarged chamber 5 in the duct. At the farther end of chamber 5 is located a condenser 6 of any suitable type, such as a labyrinth of pipes traversed by cooling water supplied by ducts 7, 7. By this means the vapor-pressure in chamber 5 may be kept very low, and the molecules of vapor may, as a consequence, issue from orifice 4 with a very high velocity. The liquid to which the vapor has condensed in the condenser 6 may then be returned to the boiler 1 by pump 8, the fluid thus completing a cycle through which it can pass repeatedly. There is, therefore, no consumption in my apparatus of the mercury or other fluid used.

The entire duct system traversed by the vapor is preferably so constructed as to be vacuum-tight, so that any desired portion of it may operate under very low pressure. Means for so constructing are too well known in the arts to require detailed description.

While all vapors are normally ionized in some degree, that degree is usually slight. Hence in the vicinity of orifice 4 the vapor employed should preferably be brought into contact with some agent for increasing the degree of its ionization. An electric arc 9 fed by a source of electromotive-force 10 through a resistor 11 is such an ionizing agent. As a result of issuing from orifice 4 into proximity to the ionizing agent 9 a large percentage of the molecules of the vapor are dissociated and form a stream of positive and negative ions moving at high velocity through chamber 5.

Figure 2:
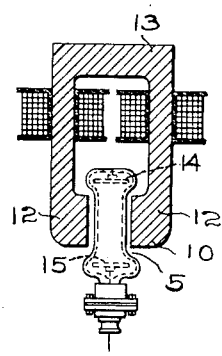
Fig. 2 is a section through a portion of Fig. 1, illustrating details of the arrangement.

On opposite sides of this chamber into which the ionized vapor issues from orifice 4, and external thereto, are the poles 12 of a powerful magnet 13 which set up a magnetic field at right angles to the path of the flying vapor-ions. Preferably the cross-section of chamber 5 is narrower in the dimension transverse to the pole-faces of the magnet than in the dimension parallel thereto, in order that the magnetomotive force required to produce a given field strength of the magnet may be minimized. Fig. 2 is a cross-section of chamber 5 on the line II—II and indicates this.

Issuing then at high velocity from orifice 4, the vapor ions are traveling at right angles to a magnetic field and, in accordance with well-known electrical laws, are deflected into curved paths, the positive ions curving in one direction and the negative ions in the opposite direction. Thus, for example, in Fig. 1 wherein the magnetic field would be normal to the plane of the paper the positive ions may follow paths curving upward while the negative ions follow paths curving downward.

At the top and bottom of the chamber 5, positioned where the flying ions will impinge upon them, are located respectively an anode plate 14 to intercept the positive ions and a cathode 15 to intercept the negative ions. These electrodes are insulated from the walls of chamber 5 and suitable leads passing through these walls by way of vacuum-tight seals of any well known construction connect them electrically with external circuits. Preferably the cathode 15, at least, should be made an emitter of electrons; coating an electrode with oxides of the alkali-earth metals and heating it to a high temperature during operation are well known ways of making an electrode emit electrons. Such electrodes may be called thermionic emitters. Current from a source of electromotive-force 16 controlled by a resistor 17 may be used to heat the cathode 15 for this purpose. Upon striking the anode the positive ions deposit thereon their charges of positive electricity, and conversely, upon striking the cathode, the negative ions deposit thereon their negative charges. By leading these deposited charges to a work circuit through conductors 18 and 19 electrical current may be consumed therein in any of the usual ways.

It is desirable that the velocity with which the ions enter the field of magnet 13 shall be as high as possible, since in approaching electrodes 14 and 15 they overcome an electrical potential-gradient proportional to the potential difference of the supply lines 18 and 19. The energy available for traversing this gradient is that due to their velocity and, consequently, the higher this velocity is, the higher may be the voltage of supply lines 18 and 19. To produce this high velocity the pressure in the chamber surrounding condenser 6 should be kept as low as possible; any known expedient such as the use of a vacuum pump, may be resorted to for this purpose. The cooling medium for the condenser should be of the minimum temperature available for this same reason.

At least one of the electrodes is described as being a thermionic emitter. By this expedient the potential drop at its surface, which would be large if an ordinary electrode were used, is minimized with great resulting advantage. It is obvious that the essential quality is that of emitting electrons and, while a heated electrode is one device possessing this quality, electrodes which emit electrons without the need of heat as an exciting agent are within the scope of my invention.

Figure 3:
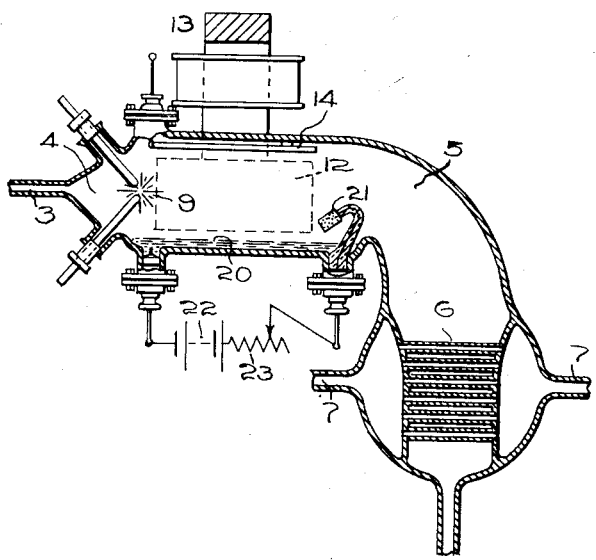
Fig. 3 is a detail of a different embodiment.

In Fig. 3 I show a modification of my invention in which the electrode designed to emit thermions consists of a mercury pool 20 which is excited as a cathode by an auxiliary arc fed through anode 21 from a direct-current source 22 through a suitable resistor 23. Such a mercury electrode is known to be a thermionic emitter and, as such, may replace the heated electrode 15 described in connection with Fig. 1. Such a mercury electrode is not subject to the practical limitations as to current capacity that characterize heated metals as thermionic sources. It is, therefore, more suitable for certain uses where a large current output is desired.

By means of my invention as above described it is, therefore, possible to transform the heat energy of a fuel into electrical energy and to supply a work circuit therewith in a direct manner, with relatively simple apparatus not involving rotating parts and free from the insulation difficulties inherent in the windings of ordinary dynamo-electric machines.

While I have described the provision of certain features such as the ionizing arc 9 and the thermionically active electrode 15 in the above described embodiment of my invention it is to be understood that they are adjunctive rather than essential to an operative arrangement, and when certain fluids are employed as the operative medium their use may not be desirable.

It will also be recognized that the repeated use of the identical quantity of fluid which I have described is not an indispensable feature and that if it is possible to obtain the vapor in its high-pressure condition from any source whatever, and to reject it in the desired low-pressure condition, this will still be within the purview of my invention.

Various modifications of the particular embodiment of my invention which I have just described will be readily apparent to those skilled in the arts, and it is my desire that only such limitations shall be placed upon my invention as are indicated in the appended claims or are imposed by the prior art.

I claim as my invention:

1. A method of transforming energy which comprises heating a fluid to vaporize it, subjecting said vapor to the influence of an additional ionizing agency, then permitting said vapor to acquire, by expanding, velocity relative to a magnetic field, then causing said ions to traverse said magnetic field to segregate ions of opposite polarities, transferring the charges from ions of opposite polarities to opposite terminals of a work circuit, and condensing said vapor at a temperature at which its vapor-pressure is negligible.

2. A method of transforming energy which comprises heating a fluid to vaporize it, ionizing said vapor, expanding said vapor through an orifice, causing said expanded vapor to flow across a magnetic field and between two electrodes at least one of which is thermionically active, and conducting current from said two electrodes to a work circuit.

3. An electrical apparatus comprising means for generating vapor under pressure, a receiver at low pressure, a duct connecting said source and said receiver, a magnet having its field transverse to the axis of said duct, and two electrodes near the top and bottom of said duct respectively, at least one of said electrodes comprising an emitter of electrons.

4. An electrical apparatus comprising means for generating vapor under pressure, a receiver at low pressure, a duct connecting said source with said receiver, a magnet having its field transverse to the axis of said duct, and two electrodes near the top and bottom of said duct respectively, at least one of said electrodes being provided with heating means.

5. An electrical apparatus comprising means for generating vapor under pressure, a receiver at low pressure, a duct connecting said source with said receiver, means to ionize said vapor, a magnet having its field transverse to the axis of said duct, and two electrodes near the top and bottom of said duct respectively, at least one of said electrodes comprising an emitter of electrons.

6. Apparatus for transforming heat into electrical energy comprising a boiler for containing a liquid, means for heating said liquid, a condenser, a duct connecting said boiler with said condenser, ionizing means in said duct positioned at the end thereof nearer to said boiler, a magnet having its pole-faces on opposite sides of said duct, electrodes inside said duct near the top and bottom thereof and a work circuit connected to said electrodes.

7. A method of generating an electric current which comprises first subjecting a vapor to the influence of an ionizing agency other than heat, then projecting said vapor through a magnetic field, and separately collecting ions of opposite polarities.

8. A method of generating an electric current which comprises vaporizing a fluid, then subjecting said vapor to an ionizing agency other than heat, causing said vapor, by expanding, to acquire velocity relative to a magnetic field thereby segregating ions of opposite polarities, and separately collecting said ions of opposite polarities.

9. A method of generating electric current which comprises vaporizing a fluid, then subjecting said vapor to an ionizing agency other than heat, then projecting said ionized vapor across a magnetic field to segregate ions of opposite polarities, separately collecting ions of opposite polarities, and condensing said vapor.

10. A method of generating electric current which comprises vaporizing a fluid, ionizing said vapor, and projecting said ionized vapor across a magnetic field between two electrodes at least one of which is an emitter of electrons.

11. Apparatus for transforming thermal energy into electrical energy comprising a boiler for containing mercury, a source of heat for said boiler, a condenser, a duct connecting said boiler with said condenser, ionizing means in said duct, a magnet having its pole-faces on opposite sides of said duct and exterior thereto, electrodes inside said duct near the top and bottom thereof, at least one of said electrodes being capable of emitting electrons, and a work circuit connected to said electrodes.

12. Apparatus for transforming thermal energy into electrical energy comprising a boiler for containing mercury, a source of heat for said boiler, a condenser, a duct connecting said boiler with said condenser, ionizing means in said duct, a magnet having its pole-faces on opposite sides of said duct and exterior thereto, electrodes inside said duct near the top and bottom thereof, means for heating at least one of said electrodes, and a work circuit connected to said electrodes.

In testimony whereof, I have hereunto subscribed my name this 4th day of January, 1927.

REINHOLD RUDENBERG.